(12) United States Patent
Dohi

(10) Patent No.: US 10,091,369 B2
(45) Date of Patent: Oct. 2, 2018

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Makoto Dohi, Naka-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/552,057

(22) Filed: Nov. 24, 2014

(65) Prior Publication Data

US 2015/0146249 A1 May 28, 2015

(30) Foreign Application Priority Data

Nov. 27, 2013 (JP) ................................. 2013-245200

(51) Int. Cl.
H04N 1/00 (2006.01)

(52) U.S. Cl.
CPC ....... H04N 1/00477 (2013.01); H04N 1/0092 (2013.01); *H04N 2201/0094* (2013.01)

(58) Field of Classification Search
CPC .................................................. H04N 1/0092
See application file for complete search history.

(56) References Cited

U.S. PATENT DOCUMENTS

| | | | | |
|---|---|---|---|---|
| 2002/0126307 A1* | 9/2002 | Ohwa | ................ | H04N 1/00954 358/1.14 |
| 2002/0196478 A1* | 12/2002 | Struble | .............. | G06Q 30/0601 358/474 |
| 2003/0202217 A1* | 10/2003 | Limoto | .................. | H04N 1/324 358/407 |
| 2007/0268508 A1* | 11/2007 | Kitamura | ............... | G06K 15/00 358/1.14 |
| 2008/0137152 A1* | 6/2008 | Oguri | ................. | H04N 1/00384 358/440 |
| 2008/0186535 A1* | 8/2008 | Maeda | ................. | H04N 1/0001 358/1.15 |
| 2009/0094694 A1* | 4/2009 | Kodaira | ............. | H04N 1/00413 726/16 |
| 2010/0110453 A1* | 5/2010 | Kano | .................... | G06F 3/1222 358/1.6 |
| 2011/0051179 A1* | 3/2011 | Iga | ..................... | H04N 1/32037 358/1.15 |
| 2013/0159536 A1* | 6/2013 | Kawabata | ........... | H04L 65/1069 709/227 |

FOREIGN PATENT DOCUMENTS

| | | | |
|---|---|---|---|
| JP | H07-288625 | A | 10/1995 |
| JP | 2006-076090 | A | 3/2006 |
| JP | 2009-086976 | A | 4/2009 |

* cited by examiner

*Primary Examiner* — John R Wallace
(74) *Attorney, Agent, or Firm* — Canon U.S.A., Inc. IP Division

(57) ABSTRACT

An image processing system that prevents erroneous job execution without significantly decreasing the usability includes receiving a request relating to a job, accepting a job execution instruction, and executing the job in response to acceptance of the execution instruction. If a plurality of requests relating to jobs is received, information for confirmation of the job is provided. If a single request relating to a job is received, information for confirmation of the job is not provided.

13 Claims, 17 Drawing Sheets

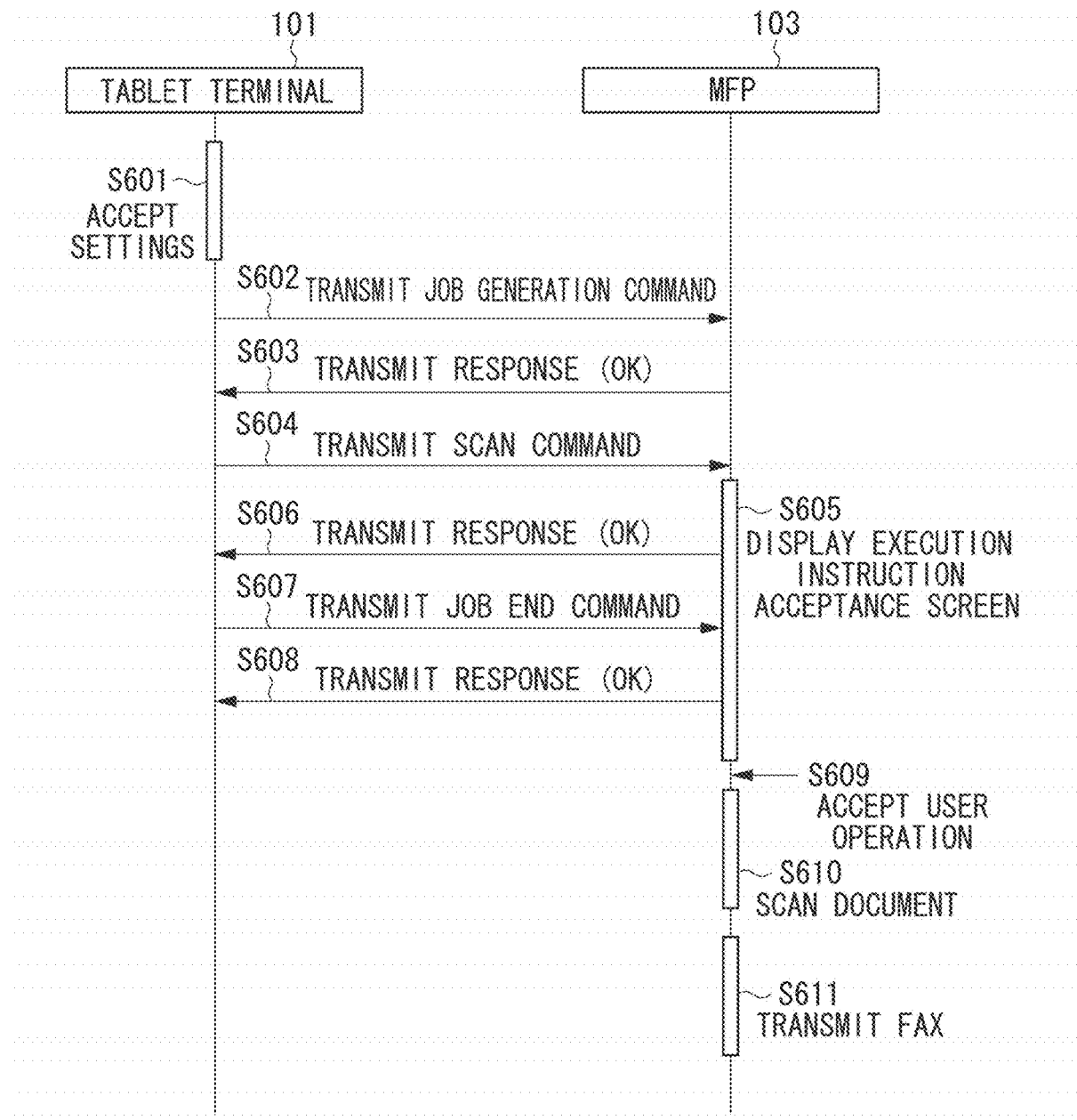

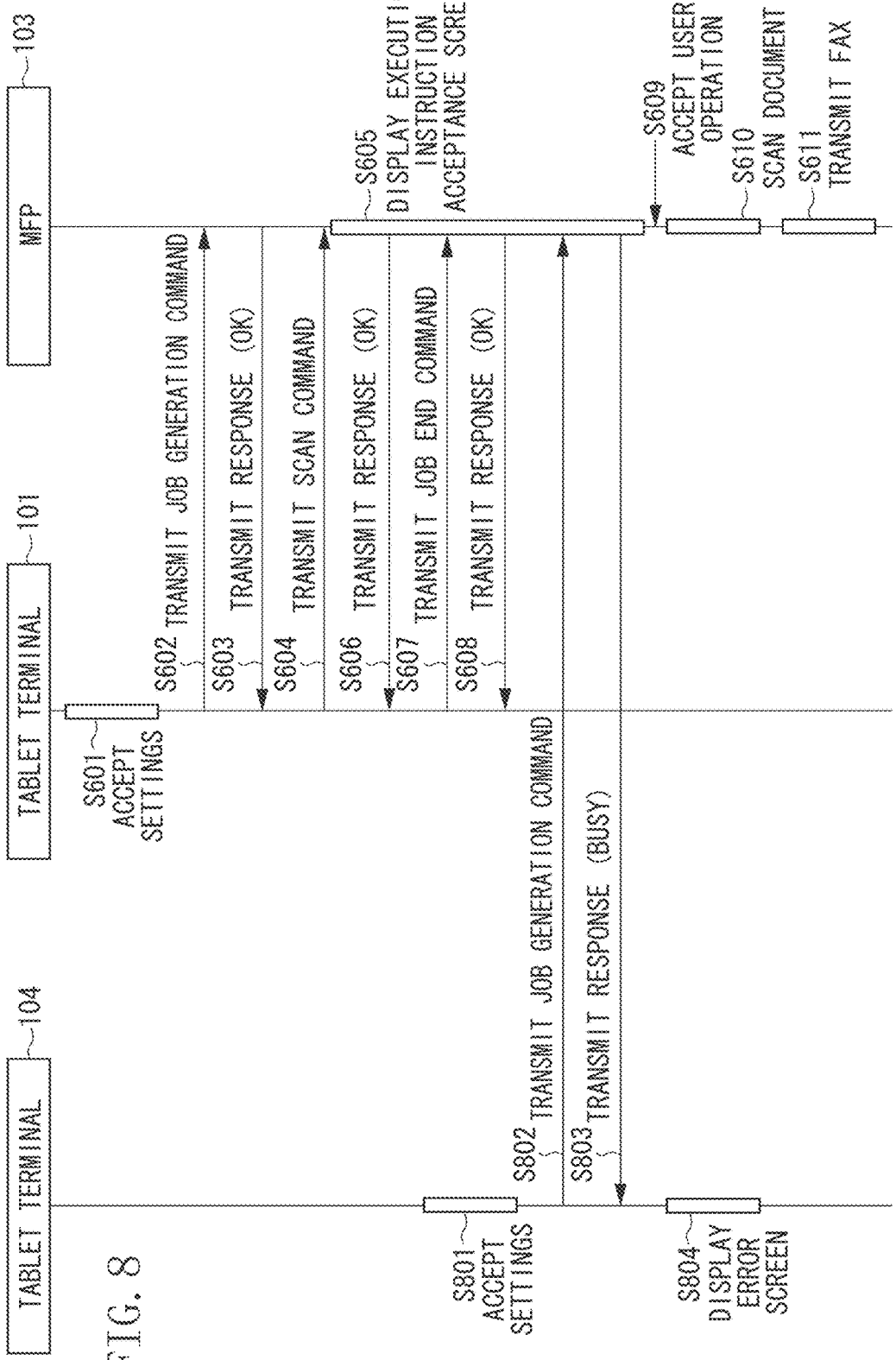

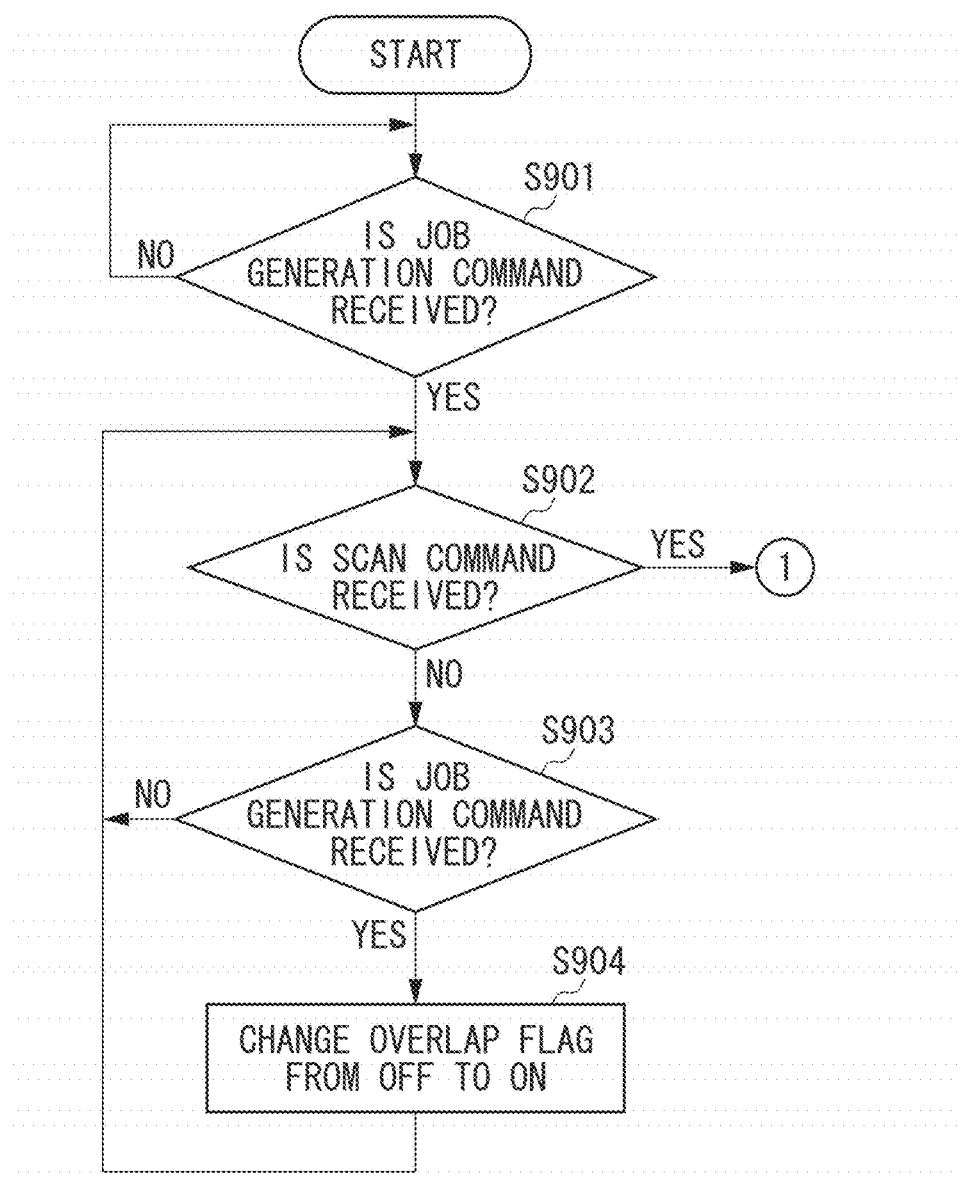

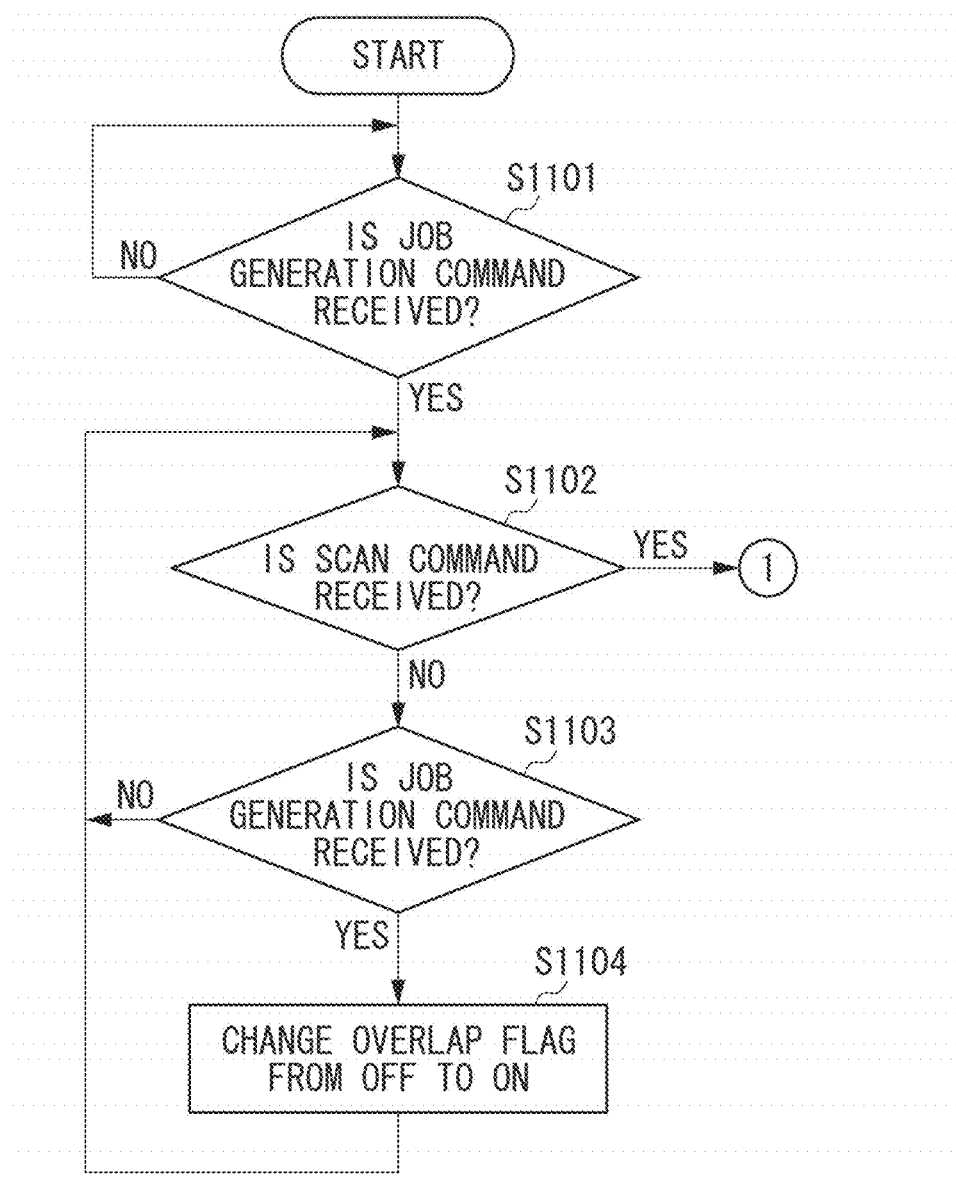

IMAGE PROCESSING SYSTEM, IMAGE PROCESSING METHOD, AND STORAGE MEDIUM

BACKGROUND

Field

Aspects of the present invention generally relate to an image processing system which accepts a job execution instruction from a user, and performs a job.

Description of the Related Art

In a conventionally-known image processing system, a user uses a terminal to set contents of a job and transmits a request relating to the job (which will simply be referred to as "a job request" as needed) to an image processing apparatus. When receiving the request, the image processing apparatus performs the job.

For example, Japanese Patent Application Laid-Open No. 7-288625 discusses a mechanism for transmitting documents read by a scanner via facsimile (fax) by using a system including an information processing terminal and a fax apparatus. In the system described in Japanese Patent Application Laid-Open No. 7-288625, a user uses an information processing terminal to specify a resolution for documents to be read and a telephone number or the like of a destination, and transmit a document transmission instruction command including the specified contents to a fax apparatus. The fax apparatus reads the documents and faxes the image data in accordance with the contents of the document transmission instruction command.

Some image processing apparatuses possibly perform a job in response to accepting a job execution instruction from a user. For example, if a job to be performed is reading a document and faxing image data, in response to accepting a job execution instruction from a user, the image processing apparatus sequentially performs processing for reading the document and processing for faxing the image data.

However, if a plurality of terminals transmits requests relating to jobs or if a single terminal consecutively transmits a plurality of requests, the following cases could occur.

For example, there are cases where a user operating a first terminal transmits a fax transmission job request to an image processing apparatus and, shortly after the request, another user operating a second terminal transmits another fax transmission job request to the same image processing apparatus. In such cases, if the image processing apparatus is configured not to accept a plurality of job requests simultaneously, the image processing apparatus accepts the job request that is first received from the first terminal, but does not accept the job request that is next received from the second terminal.

The second terminal is notified that the job request from the second terminal has not been accepted. However, if, for example, the user of the second terminal leaves the second terminal for where the image processing apparatus is located, the user of the second terminal may fail to notice that the job request has not been accepted. If this is the case, the user of the second terminal operates the image processing apparatus, mistakenly assuming that his/her own job request has been accepted by the image processing apparatus. If the user of the first terminal has not yet reached the image processing apparatus at this point, the accepted job (namely, the job from the first terminal) is still stored in the image processing apparatus. Thus, mistakenly assuming that this stored job is his/her own job, the user of the second terminal sets his/her own documents on a scanner and issues a job execution instruction. As a result, the contents of the documents brought by the user of the second terminal could be erroneously transmitted to a destination set by the user of the first terminal and information leakage could occur.

This case could also occur when a single terminal is shared by a plurality of users. Even if a single terminal is used by a single user, if the user consecutively operates the terminal to fax a plurality of documents to respective different destinations, the user may erroneously issue incorrect job execution instructions, resulting in erroneous transmission.

As a method for preventing erroneous transmission, there has been conventionally known a method of displaying a destination confirmation screen when a user issues a transmission job execution instruction, for example. However, if information for confirmation is always provided or if an operation for confirmation is always requested regardless of the possibility of occurrence of erroneous transmission, usability is decreased.

SUMMARY

Aspects of the present invention are generally directed to an image processing system capable of preventing execution of an erroneous job without significantly decreasing usability.

According to an aspect of the present invention, an image processing system includes a receiving unit configured to receive a request relating to a job, an accepting unit configured to accept an execution instruction of the job, an execution unit configured to execute the job in response to acceptance of the execution instruction, and a providing unit configured to provide information for confirmation of the job. If the receiving unit receives a plurality of requests relating to jobs, the providing unit provides the information, and if the receiving unit receives a single request relating to a job, the providing unit does not provide the information.

Further features of the present disclosure will become apparent from the following description of exemplary embodiments with reference to the attached drawings.

BRIEF DESCRIPTION OF THE DRAWINGS

FIG. 6 is a sequence diagram according to an exemplary embodiment.

FIG. 8 is a sequence diagram according to an exemplary embodiment.

DESCRIPTION OF THE EMBODIMENTS

Various exemplary embodiments will be described in detail below with reference to the drawings. It is to be understood that the following exemplary embodiments are not intended to be limiting and that all combinations of features described in the exemplary embodiments are not necessarily essential to the technical solution provided by the present disclosure.

Figure 1:
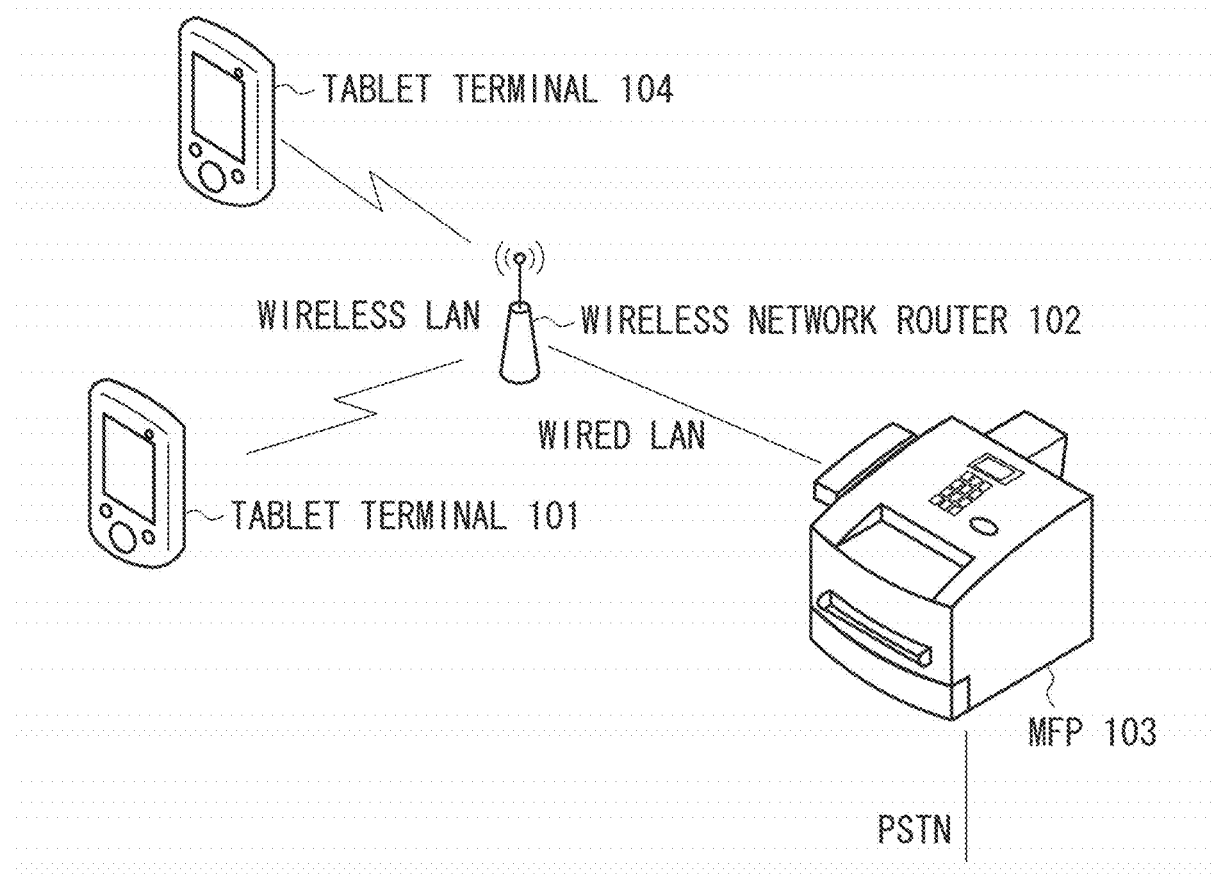
FIG. 1 illustrates an overall configuration of a network according to an exemplary embodiment.

First, a first exemplary embodiment will be described. FIG. 1 illustrates an overall configuration of a network. Tablet terminals 101 and 104, each of which is an example of an information processing apparatus, communicate with a multi-function peripheral (MFP) 103 via a wireless network router (a wireless access point) 102. The MFP 103 is an example of an image processing apparatus. The MFP 103 alone can be referred to as an image processing system. Alternatively, an entire configuration including the MFP 103 and the tablet terminal 101 or 104 can be referred to as an image processing system. The tablet terminals 101 and 104 are connected with the wireless network router 102 via a wireless local area network (LAN). The MFP 103 and the wireless network router 102 are connected with each other via a wired LAN. In addition, the MFP 103 is also connected to a public switched telephone network (PSTN).

The communication paths between the tablet terminals 101 and 104 and the MFP 103 are not limited to the above paths. For example, the tablet terminals 101 and 104 may be connected to the wireless network router 102 via a wired LAN. The MFP 103 and the wireless network router 102 may be connected with each other via a wireless LAN. In addition, the tablet terminal 101/104 or the MFP 103 may include the wireless network router 102. While the MFP 103 is used as an example of an image processing apparatus in this description, a single function peripheral (SFP) may alternatively be used as long as the SFP can perform a job.

Figure 2:
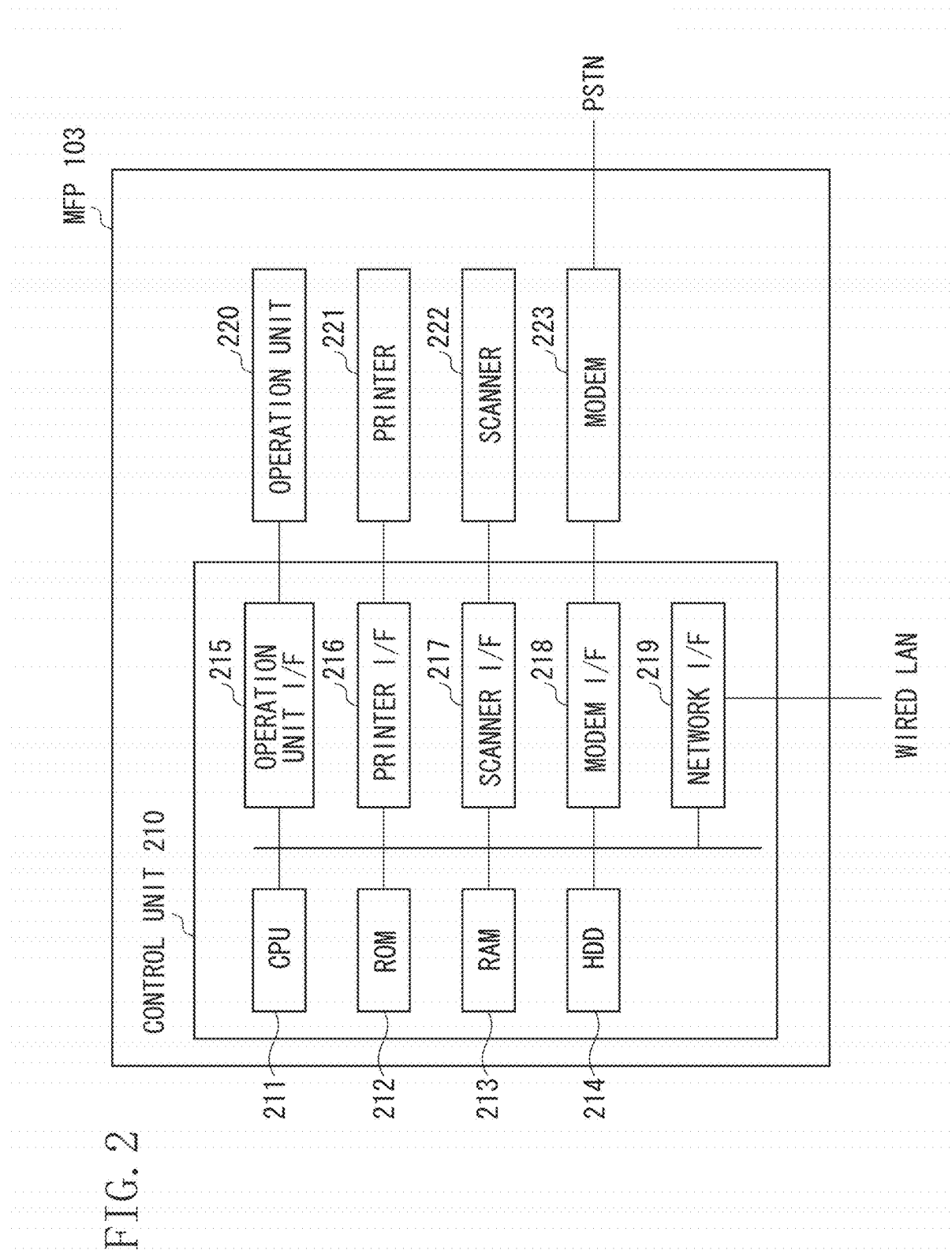
FIG. 2 illustrates a hardware configuration of a multi-function peripheral (MFP) 103 according to an exemplary embodiment.

FIG. 2 illustrates a hardware configuration of the MFP 103. A control unit 210 including a central processing unit (CPU) 211 controls an overall operation of the MFP 103. The CPU 211 controls various operations such as for reading, printing, and communication by reading control programs stored in a read-only memory (ROM) 212. A random access memory (RAM) 213 is used as a main memory for the CPU 211 and a temporary storage area such as a work area. The single CPU 211 in the MFP 103 performs each process in the flowcharts described below by using a single memory (the RAM 213 or a hard disk drive (HDD) 214). However, other modes may be adopted. For example, each process in the flowcharts may be performed by using a plurality of CPUs or a plurality of RAMs or HDDs while causing them to cooperate with each other.

The HDD 214 stores image data and various programs. An operation unit interface (I/F) 215 connects an operation unit 220 to the control unit 210. The operation unit 220 includes a liquid crystal display unit having a touch-screen function and a keyboard, and serves as an accepting unit for accepting user operations, entries, and instructions.

A printer I/F 216 connects a printer 221 to the control unit 210. Image data to be printed by the printer 221 is transferred thereto from the control unit 210 via the printer I/F 216, and printed on a recording medium by the printer 221.

A scanner I/F 217 connects a scanner 222 to the control unit 210. The scanner 222 reads an image on a document, generates image data, and inputs the image data to the control unit 210 via the scanner I/F 217.

A modem I/F 218 connects a modem 223 to the control unit 210. The modem 223 is connected to the PSTN and performs fax communication of image data with a fax apparatus (not illustrated). A network I/F 219 connects the control unit 210 (the MFP 103) to the wired LAN. The MFP 103 can transmit and receive image data and various types of information to and from external apparatuses by using the network I/F 219.

Figure 3:
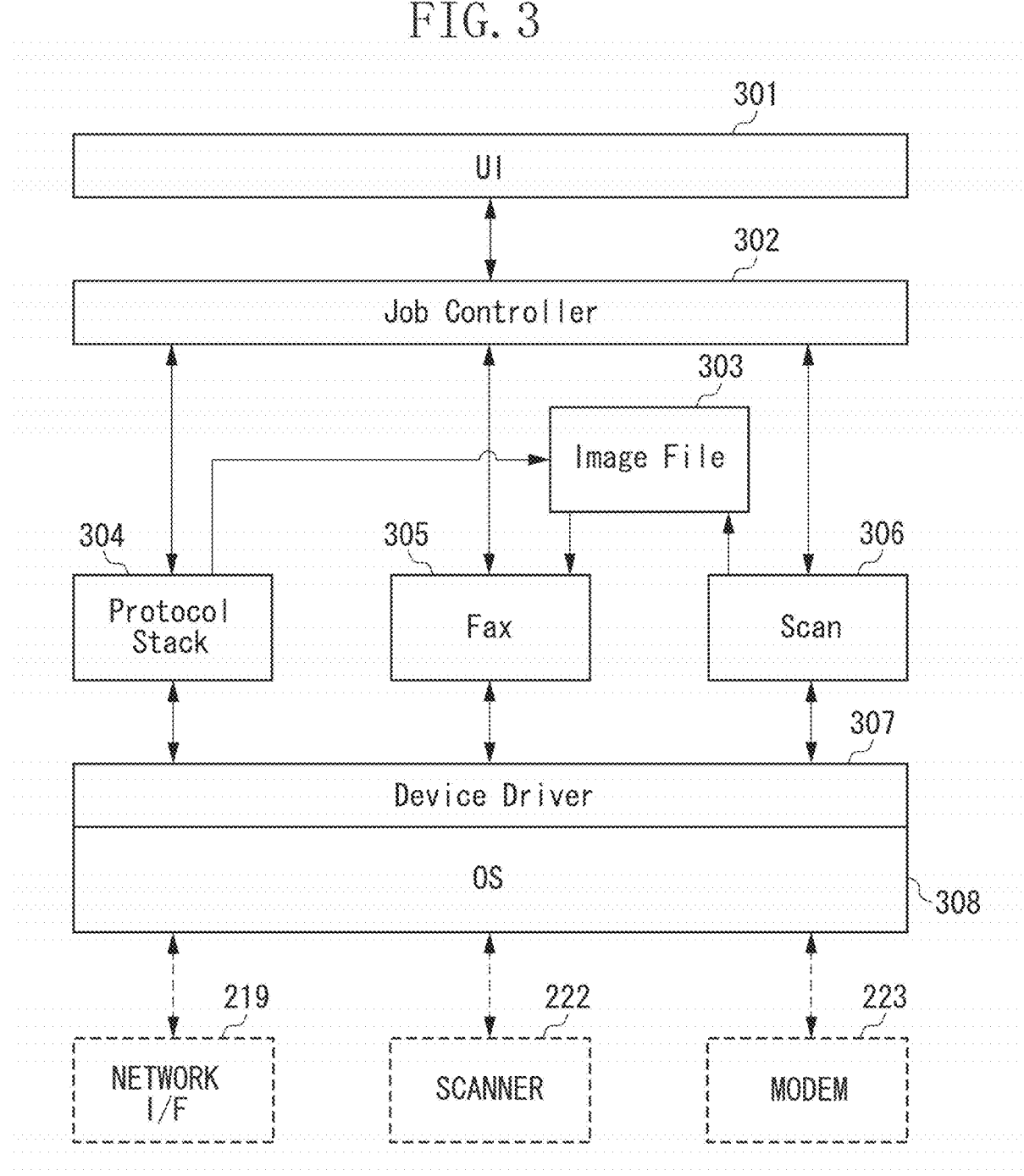
FIG. 3 illustrates a software configuration of the MFP 103 according to an exemplary embodiment.

FIG. 3 illustrates a software configuration of the MFP 103. Units indicated by solid lines in FIG. 3 are software modules to be realized by the CPU 211 reading and executing programs stored in the ROM 212 or the HDD 214. A user interface (UI) unit 301 provides a user with various types of information and accepts various instructions from a user via the operation unit 220. A job controller unit 302 accepts jobs such as for copying, printing and faxing, and controls execution of the accepted jobs. A protocol stack unit 304 stores various network protocols such as the Transmission Control Protocol/Internet Protocol (TCP/IP) and the Hypertext Transfer Protocol (HTTP).

In the present exemplary embodiment, image data transmitted from the tablet terminals 101 and 104 is received via the network I/F 219 in accordance with a network protocol stored in the protocol stack unit 304. The received image data is stored by an image file unit 303. The image file unit 303 is a software module that manages image data stored in the RAM 213 and the HDD 214.

The image file unit 303 stores not only image data received via the network I/F 219 but also image data generated by the scanner 222. A scan unit 306 controls generation of image data by the scanner 222. A fax unit 305 controls fax communication via the modem 223. When fax transmission from the MFP 103 is performed, the fax unit 305 reads image data stored in the image file unit 303 and transmits the read image data.

An operating system (OS) unit 308 manages the entire software in the MFP 103 by adjusting each module and task. The OS unit 308 is combined with a device driver unit 307. The device driver unit 307 controls hardware devices such as the scanner 222 and the modem 223.

Figure 4:
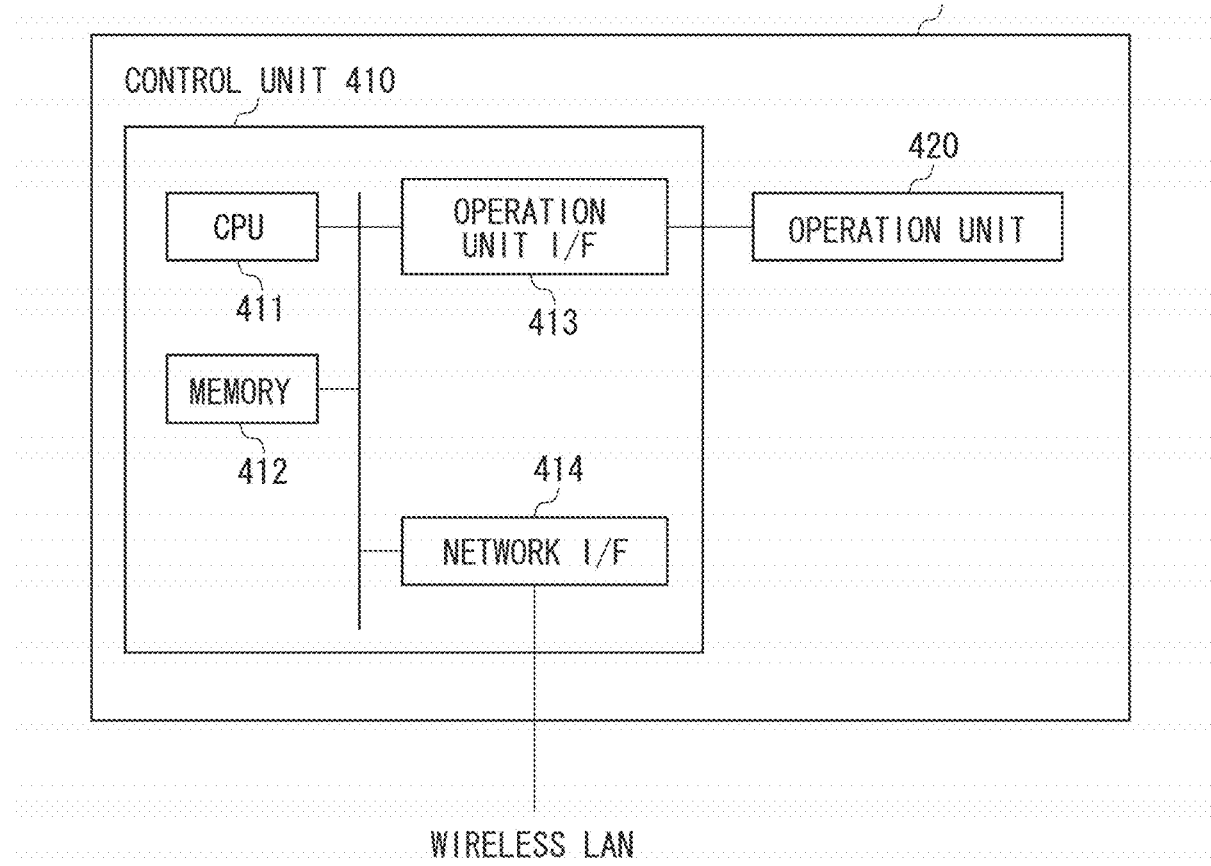
FIG. 4 illustrates a hardware configuration of tablet terminals 101 and 104 according to an exemplary embodiment.

FIG. 4 illustrates a hardware configuration of the tablet terminal 101. A control unit 410 including a CPU 411 controls an overall operation of the tablet terminal 101. The CPU 411 performs various control operations by reading control programs stored in a memory 412. In addition, the memory 412 is also used as a main memory for the CPU 411 and a temporary storage area such as a work area. In the tablet terminal 101, the single CPU 411 performs each process by using the single memory 412. However, other modes may be adopted. For example, each process may be performed by using a plurality of CPUs or a plurality of memories while causing them to cooperate with each other.

An operation unit I/F 413 connects an operation unit 420 to the control unit 410. The operation unit 420 includes a liquid crystal display unit having a touch-screen function, and serves as an accepting unit for accepting user operations, entries, and instructions, for example. A network I/F 414 connects the control unit 410 (the tablet terminal 101) to the wireless LAN. The tablet terminal 101 can transmit image data and information to external apparatuses and receive various types of information, by using the network I/F 414. The tablet terminal 104 has a configuration similar to the tablet terminal 101.

Figure 5:
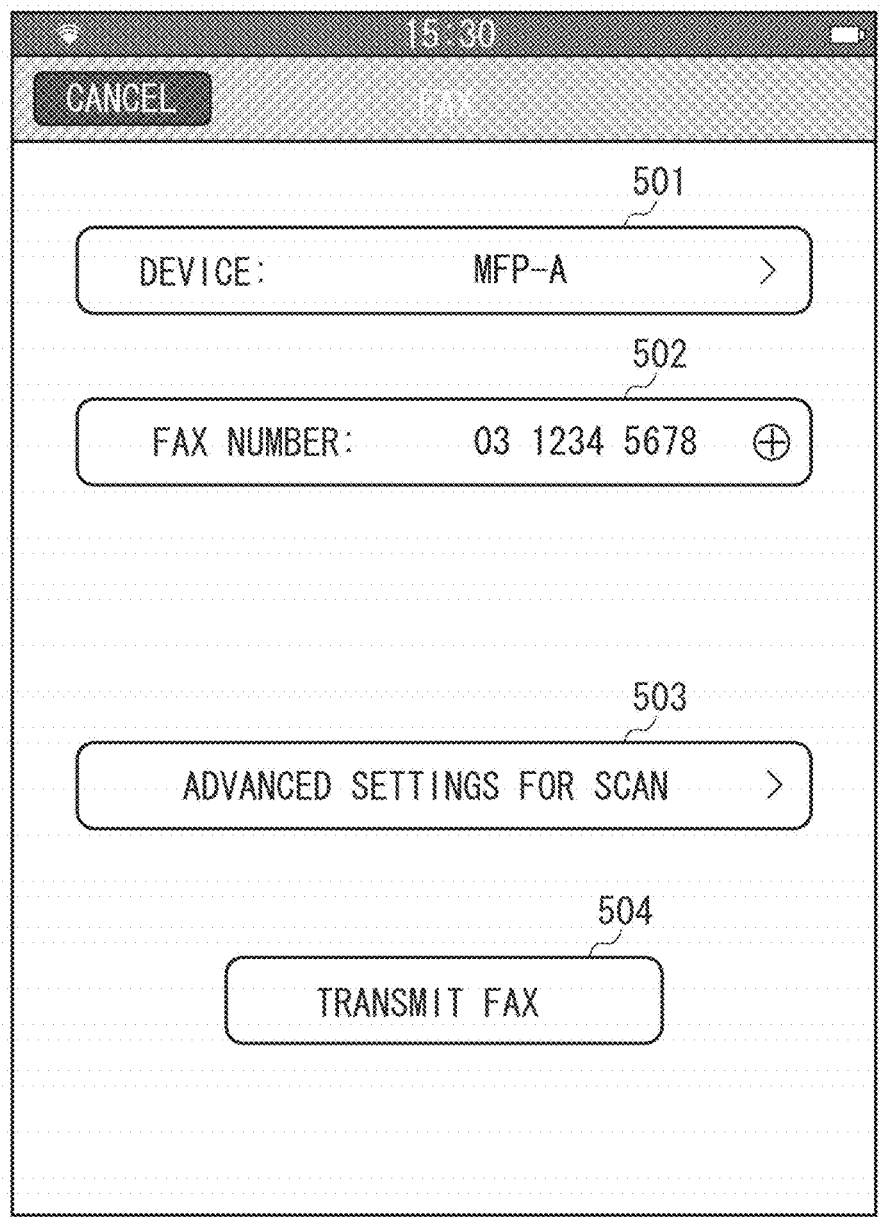
FIG. 5 illustrates an operation screen of the tablet terminals 101 and 104 according to an exemplary embodiment.

FIG. 5 illustrates an operation screen of a fax transmission application to be displayed on the tablet terminal 101/104. The fax transmission application can be downloaded from a server on the Internet and installed on the tablet terminal 101/104 as an additional application. By using this fax transmission application, the user can make settings for causing the MFP 103 to perform fax transmission, on the tablet terminal 101/104 side. Operations of the tablet terminal 101/104, which will be described below, are performed on the basis of instructions from the fax transmission application.

When the user starts the fax transmission application on the tablet terminal 101/104, the operation screen illustrated in FIG. 5 is displayed. A setting field 501 is a field for setting an MFP caused to perform fax transmission. If the user touches the setting field 501, the tablet terminal 101/104 searches for nearby MFPs and displays a list of the MFPs found by the search. The user can select an MFP caused to perform fax transmission from among the displayed MFPs.

A setting field 502 is a field for setting a telephone number (a fax number) as a fax transmission destination. The user may enter a telephone number by using a software keyboard displayed on the tablet terminal 101/104 or select a telephone number by referring to an address book stored in the tablet terminal 101/104.

A setting field 503 is a field for entering advanced settings of scanning processing (reading processing) performed by the scanner 221 of the MFP 103. If the user touches the setting field 503, a screen for specifying reading parameters such as a resolution, a document size, and color/monochrome is displayed. The tablet terminal 101/104 accepts the scan settings from the user via this screen.

A "Transmit Fax" key 504 is a key for instructing the MFP 103 to perform fax transmission. If the user presses the "Transmit Fax" key 504 after making settings in the setting fields 501 to 503, the tablet terminal 101/104 starts communication with the MFP 103.

FIG. 6 is a sequence diagram illustrating processing performed by the tablet terminal 101 and the MFP 103. In step S601, the tablet terminal 101 accepts settings from a user via the operation screen illustrated in FIG. 5. In step S602, the tablet terminal 101 transmits a job generation command (a request relating to a job) to the MFP 103. Accordingly, the MFP 103 receives the command. In step S603, the MFP 103 transmits a response "OK" to the tablet terminal 101.

In step S604, the tablet terminal 101 transmits to the MFP 103 a scan command for instructing the MFP 103 to perform scanning. Accordingly, the MFP 103 receives the scan command. In step S605, the MFP 103 displays an execution instruction acceptance screen.

Figure 7A:
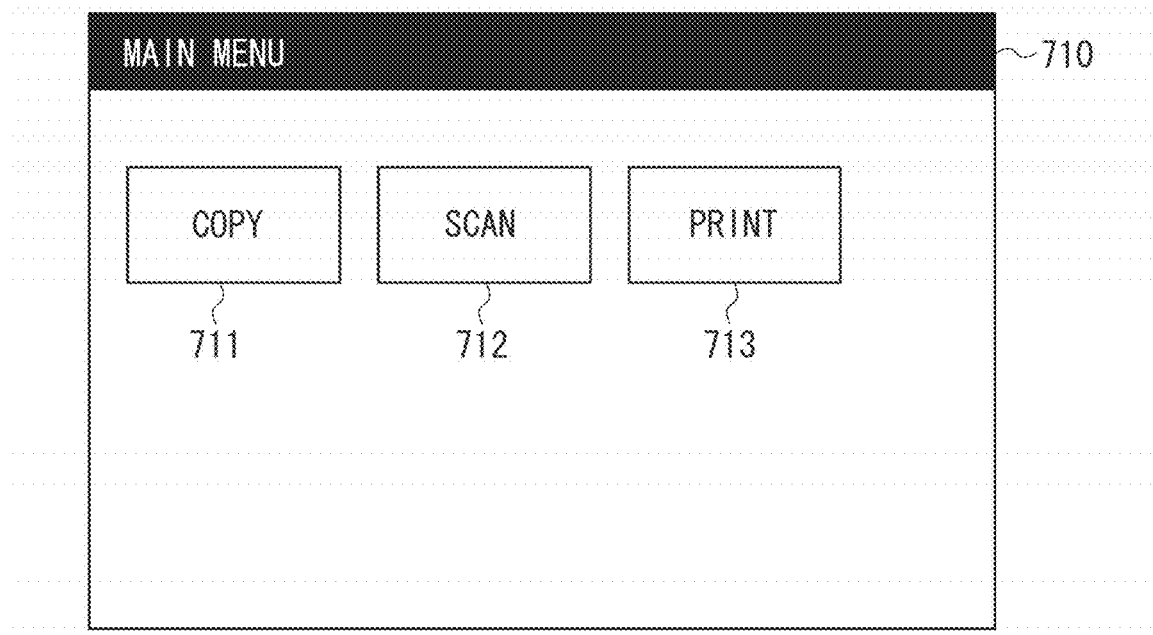
FIGS. 7A and 7B illustrate operation screens of the MFP 103 according to an exemplary embodiment.
Figure 7B:
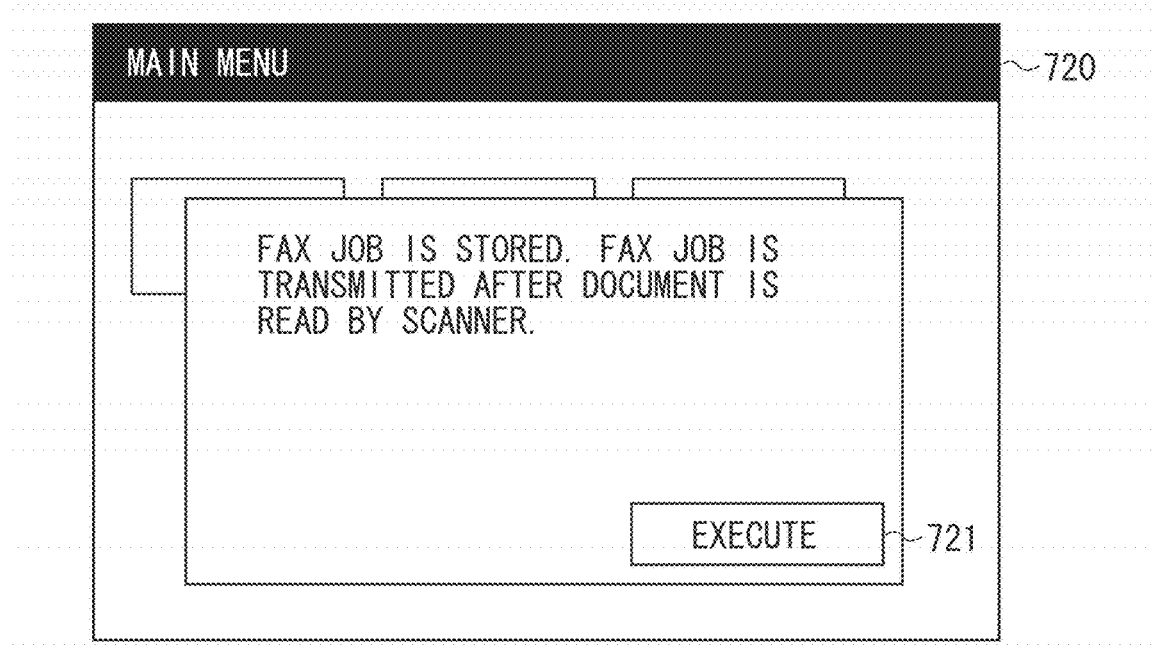

FIGS. 7A and 7B illustrate transition of screens displayed on the operation unit 220 before and after the MFP 103 receives the scan command in step S604. FIG. 7A illustrates a menu screen 710 of the MFP 103 displayed on the operation unit 220. A "Copy" key 711, a "Scan" key 712, and a "Print" key 713 are operation keys each corresponding to a function of the MFP 103. The user selects a function by pressing one of the keys.

If the MFP 103 receives the scan command with the menu screen 710 being displayed, the MFP 103 displays an execution instruction acceptance screen 720 illustrated in FIG. 7B. More specifically, a pop-up dialogue for accepting a job execution instruction from the user is displayed over the menu screen 710. In the present exemplary embodiment, the description has been given of a case where the MFP 103 displays the pop-up dialogue when the MFP 103 receives the scan command with the menu screen 710 being displayed. However, when the MFP 103 receives the scan command with a screen other than the menu screen 710 being displayed, the MFP 103 displays a similar pop-up dialogue by superimposing the dialogue on the screen.

In step S606, the MFP 103 transmits a response "OK" to the tablet terminal 101 as a response to the scan command. In step S607, the tablet terminal 101 transmits a command for ending the job to the MFP 103. Accordingly, the MFP 103 receives this command. In step S608, the MFP 103 transmits a response "OK" to the tablet terminal 101.

The MFP 103 waits until a user operation is performed (pressing of an "Execute" key 721). In step S609, the MFP 103 accepts the user operation and the processing proceeds to step S610. In step S610, the MFP 103 scans a document by using the scanner 222. This processing is performed in accordance with the settings made in the setting field 503. In step S611, the MFP 103 faxes the image data obtained by the scan processing performed in step S610. The destination of the fax transmission is the telephone number set in the setting field 502.

FIG. 6 illustrates a case where the MFP 103 accepts a user operation after transmitting a response "OK" in step S608. However, the user can press the "Execute" key 721 any time after the execution instruction acceptance screen 720 is displayed, even if the processes illustrated in steps S606 to S608 are not completed. In such a case, the MFP 103 starts the scan processing in step S610 without waiting for the completion of processes in steps S606 to S608.

As described above, the MFP 103 scans the document and faxes the obtained image data, in accordance with the settings made on the tablet terminal 101.

Next, a case where requests from the tablet terminals 101 and 104 overlap will be described. FIG. 8 is a sequence diagram illustrating processing performed by the tablet terminals 101 and 104 and the MFP 103. Since steps S601 to S608 are the same as those illustrated in FIG. 6, redundant description thereof will be avoided.

In step S801, the tablet terminal 104 accepts settings from a user via the operation screen illustrated in FIG. 5. In step S802, the tablet terminal 104 transmits a job generation command (a request relating to a job) to the MFP 103. Accordingly, the MFP 103 receives this command. In step S803, the MFP 103 transmits a response "BUSY" to the tablet terminal 104.

The MFP 103 transmits a response "BUSY" in response to the request from the tablet terminal 104 since the MFP 103 has already accepted a request from the tablet terminal 101 in step S602. In other words, the MFP 103 is configured not to accept a plurality of jobs simultaneously. The MFP 103 transmits a response "BUSY" also in cases other than the above case where requests from different tablet terminals overlap. For example, when a plurality of requests from the same tablet terminal overlap, the MFP 103 transmits a response "BUSY" in response to a request transmitted subsequent to the first request.

After receiving the response "BUSY" transmitted from the MFP 103 in step S803, in step S804, the tablet terminal 104 displays an error screen indicating that the job has not been accepted. However, if, for example, the user of the tablet terminal 104 leaves the tablet terminal 104 for where the MFP 103 is located, the user may fail to notice that the job has not been accepted. In such a case, the user of the tablet terminal 104 operates the MFP 103, mistakenly assuming that his/her own job request has been accepted. If the user of the tablet terminal 101 has not yet reached the MFP 103 at this point, the accepted job (namely, the job from the tablet terminal 101) is still stored in the MFP 103.

According to the conventional technology, the user of the tablet terminal 104 may mistakenly assume that the stored job is his/her own job, set a document brought by the user on the scanner 222, and press the "Execute" key 721. As a result, information leakage could occur by this erroneous transmission.

In view of the foregoing, in the present exemplary embodiment, the MFP 103 is configured to display different execution instruction acceptance screens, depending on whether the MFP 103 receives a job generation command from the tablet terminal 104 or not (whether the MFP 103 receives a plurality of requests or receives a single request).

Figure 9B:
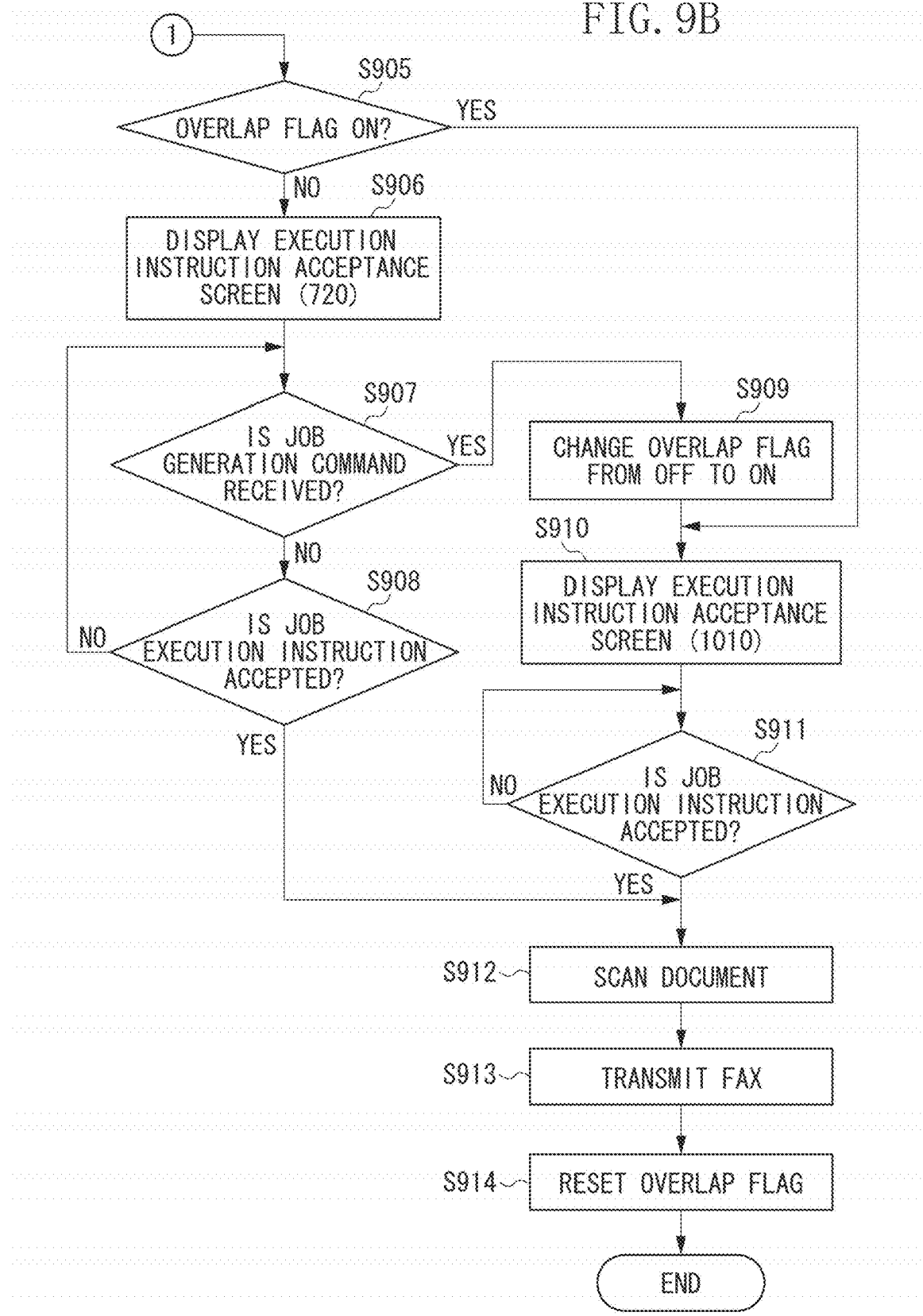
FIG. 9, which is composed of FIGS. 9A and 9B, is a flowchart illustrating an operation of the MFP 103 according to an exemplary embodiment.

FIG. 9 is a flowchart illustrating an operation of the MFP 103. The CPU 211 of the control unit 210 realizes each operation (step) in the flowchart illustrated in FIG. 9 by executing a control program stored in the ROM 212.

In step S901, the CPU 211 determines whether the MFP 103 has received a job generation command. The MFP 103 waits until receiving a job generation command. If the CPU 211 determines that the MFP 103 has received a job generation command (YES in step S901), the processing proceeds to step S902.

In step S902, the CPU 211 determines whether the MFP 103 has received a scan command. If the CPU 211 determines that the MFP 103 has received a scan command (YES in step S902), the processing proceeds to step S905. If, on the other hand, the CPU 211 determines that the MFP 103 has not received a scan command (NO in step S902), the processing proceeds to step S903.

In step S903, the CPU 211 determines whether the MFP 103 has received another job generation command. Since the CPU 211 has already determined reception of one job generation command in step S901, in this step S903, the CPU 211 determines whether the MFP 103 has received a second or a subsequent job generation command. In step S903, if the CPU 211 determines that the MFP 103 has received another job generation command (YES in step S903), the processing proceeds to step S904. In step S904, an overlap flag is changed from OFF to ON. Next, the processing returns to step S902. The overlap flag indicates whether the MFP 103 has received a plurality of job generation commands. The overlap flag is stored in the RAM 213. The overlap flag is set to OFF by default. If the MFP 103 receives a second job generation command, the overlap flag is changed to ON. In step S903, if the CPU 211 determines that the MFP 103 has not received another job generation command (NO in step S903), the processing returns to step S902 while skipping step S904.

In step S905, the CPU 211 determines whether the overlap flag is ON. If the CPU 211 determines that the overlap flag is not ON, namely, if the MFP 103 has received only one job generation command (NO in step S905), the processing proceeds to step S906. In step S906, the CPU 211 displays the execution instruction acceptance screen 720 on the operation unit 220. On the other hand, in step S905, if the CPU 211 determines that the overlap flag is ON, namely, if the MFP 103 has received a plurality of job generation commands (YES in step S905), the processing proceeds to step S910.

In step S907, the CPU 211 determines whether the MFP 103 has received another job generation command. Since the CPU 211 has already determined reception of one job generation command in step S901, the CPU 211 determines whether the MFP 103 has received a second or a subsequent job generation command, as in step S903. In step S907, if the CPU 211 determines that the MFP 103 has received another job generation command (YES in step S907), the processing proceeds to step S909. In step 909, the overlap flag is changed from OFF to ON. Next, the processing proceeds to step S910.

On the other hand, in step S907, if the CPU 211 determines that the MFP 103 has not received another job generation command (NO in step S907), the processing proceeds to step S908. In step S908, the CPU 211 determines whether the MFP 103 has accepted a job execution instruction (whether the "Execute" key 721 has been pressed). In step S908, if the CPU 211 determines that the MFP 103 has accepted a job execution instruction (YES in step S908), the processing proceeds to step S912. If, on the other hand, the CPU 211 determines that the MFP 103 has not accepted a job execution instruction (NO in step S908), the processing returns to step S907.

Figure 10:
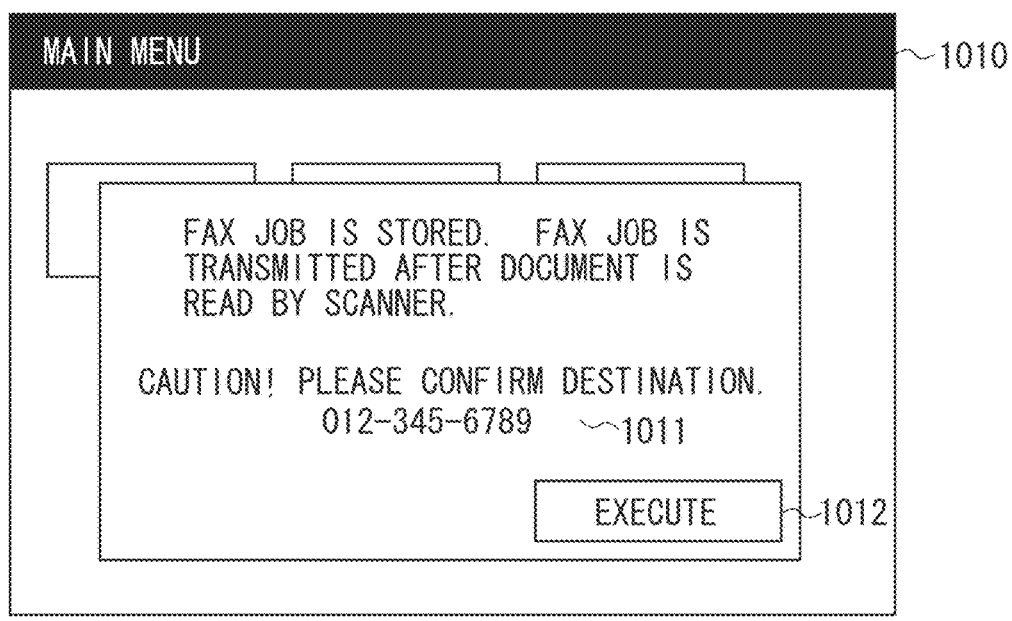
FIG. 10 illustrates an operation screen of the MFP 103 according to an exemplary embodiment.

In step S910, the CPU 211 displays an execution instruction acceptance screen 1010 illustrated in FIG. 10 on the operation unit 220. The execution instruction acceptance screen 1010 is displayed on the operation unit 220 instead of the execution instruction acceptance screen 720, and includes an operation key (an "Execute" key 1012) for instructing the MFP 103 to perform the job. When the execution instruction acceptance screen 1010 is compared with the execution instruction acceptance screen 720, it is seen that the execution instruction acceptance screen 1010 includes fax transmission destination information 1011 that is not included in the execution instruction acceptance screen 720. As described above, if overlapping job requests are received, the possibility of occurrence of erroneous transmission is increased. Thus, the fax transmission destination information 1011 is displayed with a view to prompting the user to confirm the destination of the fax transmission. In contrast, if a job request does not overlap another job request, the possibility of occurrence of erroneous transmission is relatively low. Therefore, by reducing the amount of information on the screen (by omitting the display of the destination information 1011), the usability can be improved. Alternatively, the execution instruction acceptance screens 720 and 1010 may include an operation key for cancelling the execution of a job and an operation key for postponing the execution of a job.

In step S911, the CPU 211 determines whether the MFP 103 has accepted a job execution instruction (whether the "Execute" key 1012 has been pressed). In step S911, if the CPU 211 determines that the MFP 103 has accepted a job execution instruction (YES in step S911), the processing proceeds to step S912. If, on the other hand, the CPU 211 determines that the MFP 103 has not accepted a job execution instruction (NO in step S911), the MFP 103 waits until accepting a job execution instruction.

In step S912 (corresponding to step S610), the MFP 103 scans a document by using the scanner 222. This processing is performed in accordance with the settings made in the setting field 503. In step S913 (corresponding to step S611), the MFP 103 faxes the image data obtained by the scan processing performed in step S912. The destination of this fax transmission is the telephone number set in the setting field 502. In step S914, the overlap flag is reset. Through this process, if the overlap flag is ON, the overlap flag is changed to OFF, which is the default setting.

As described above, according to the present exemplary embodiment, if overlapping job requests are received, occurrence of erroneous transmission can be prevented by displaying a screen including information for prompting a user to confirm a job (a destination set in the job). In addition, if a job request does not overlap another job request, a screen including simpler contents is displayed, so that the usability can be improved.

Next, a second exemplary embodiment will be described. In the first exemplary embodiment, the MFP 103 displays different execution instruction acceptance screens (720 and 1010), depending on whether the MFP 103 has received overlapping job requests or not. In contrast, an MFP 103 according to the second exemplary embodiment is configured to switch whether to display an additional confirmation screen (1210) or not, depending on whether the MFP 103 has received overlapping job requests or not. In the following description of the second exemplary embodiment, only the parts different from those in the first exemplary embodiment will be described.

Figure 11B:
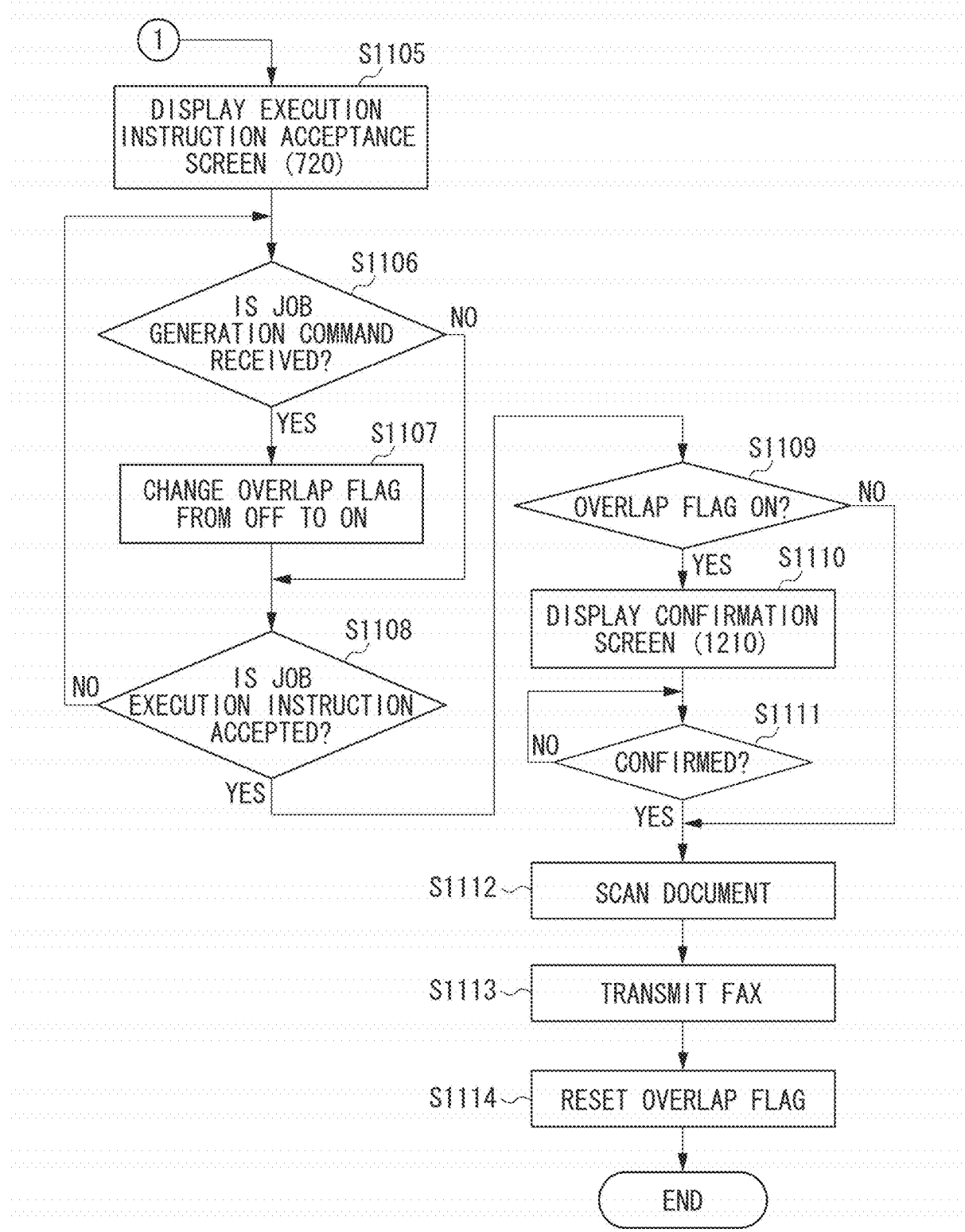
FIG. 11, which is composed of FIGS. 11A and 11B, is a flowchart illustrating an operation of an MFP 103 according to a second exemplary embodiment.

FIG. 11 is a flowchart illustrating an operation of the MFP 103. The processing in this flowchart is performed as an alternative to that in the flowchart in FIG. 9. The CPU 211 of the control unit 210 realizes each operation (step) in the flowchart illustrated in FIG. 11 by executing a control program stored in the ROM 212.

In step S1101, the CPU 211 determines whether the MFP 103 has received a job generation command. The MFP 103 waits until receiving a job generation command. If the CPU 211 determines that the MFP 103 has received a job generation command (YES in step S1101), the processing proceeds to step S1102.

In step S1102, the CPU 211 determines whether the MFP 103 has received a scan command. If the CPU 211 determines that the MFP 103 has received a scan command (YES in step S1102), the processing proceeds to step S1105. If, on the other hand, the CPU 211 determines that the MFP 103 has not received a scan command (NO in step S1102), the processing proceeds to step S1103.

In step S1103, the CPU 211 determines whether the MFP 103 has received another job generation command. Since the CPU 211 has already determined reception of one job generation command in step S1101, in this step S1103, the CPU 211 determines whether the MFP 103 has received a second or a subsequent job generation command. In step S1103, if the CPU 211 determines that the MFP 103 has received another job generation command (YES in step S1103), the processing proceeds to step S1104. In step S1104, the overlap flag is changed from OFF to ON. Next, the processing returns to step S1102. In step S1103, if the CPU 211 determines that the MFP 103 has not received another job generation command (NO in step S1103), the processing returns to step S1102 while skipping step S1104.

In step S1105, the CPU 211 displays the execution instruction acceptance screen 720 on the operation unit 220. In step S1106, the CPU 211 determines whether the MFP 103 has received another job generation command. Since the CPU 211 has already determined reception of one job generation command in step S1101, the CPU 211 determines whether the MFP 103 has received a second or a subsequent job generation command, as in step S1103. In step S1106, if the CPU 211 determines that the MFP 103 has received another job generation command (YES in step S1106), the processing proceeds to step S1107. In step S1107, the overlap flag is changed from OFF to ON. Next, the processing proceeds to step S1108. In step S1106, if the CPU 211 determines that the MFP 103 has not received another job generation command (NO in step S1106), the processing proceeds to step S1108 while skipping step S1107.

In step S1108, the CPU 211 determines whether the MFP 103 has accepted a job execution instruction (whether the "Execute" key 721 has been pressed). In step S1108, if the CPU 211 determines that the MFP 103 has accepted a job execution instruction (YES in step S1108), the processing proceeds to step S1109. If, on the other hand, the CPU 211 determines that the MFP 103 has not accepted a job execution instruction (NO in step S1108), the processing returns to step S1106.

Figure 12:
FIG. 12 illustrates an operation screen of the MFP 103 according to the second exemplary embodiment.

In step S1109, the CPU 211 determines whether the overlap flag is ON. If the CPU 211 determines that the overlap flag is ON, namely, if the MFP 103 has received a plurality of job generation commands (YES in step S1109), the processing proceeds to step S1110. In step S1110, the CPU 211 displays the confirmation screen 1210 illustrated in FIG. 12. The confirmation screen 1210 includes fax transmission destination information 1211 and a "Confirm" key 1212. If the confirmation screen 1210 is displayed, unless the user presses the "Confirm" key 1212, the job is not performed. In step S1111, the CPU 211 determines whether the destination has been confirmed (whether the "Confirm" key 1212 has been pressed). If the CPU 211 determines that the destination is confirmed (YES in step S1111), the processing proceeds to step S1112. If, on the other hand, the CPU 211 determines that the destination is not confirmed (NO in step S1111), the MFP 103 waits until the destination is confirmed. The confirmation screen 1210 may include an operation key for cancelling the execution of a job and an operation key for postponing the execution of a job.

On the other hand, in step S1109, if the CPU 211 determines that the overlap flag is not ON, namely, if the MFP 103 has received only one job generation command (NO in step S1109), the processing proceeds to S1112 while skipping steps S1110 and S1111.

In step S1112 (corresponding to S610), the MFP 103 scans a document by using the scanner 222. This processing is performed in accordance with the settings made in the setting field 503. In step S1113 (corresponding to S611), the MFP 103 faxes the image data obtained by the scan processing performed in step S1112. The destination of the fax transmission is the telephone number set in the setting field 502. In step S1114, the overlap flag is reset. Through the process, if the overlap flag is ON, the overlap flag is changed to OFF, which is the default setting.

As described above, according to the present exemplary embodiment, if a job request overlaps another job request, more user operations (pressing of the "Confirm" key 1212) are required than otherwise. As a result, better confirmation can be made by the user, and erroneous transmission can be prevented. In contrast, if a job request does not overlap another job request, fewer user operations are required, so that the usability can be improved.

Next, a third exemplary embodiment will be described. The MFP 103 according to the second exemplary embodiment is configured to display the confirmation screen 1210 including the fax transmission destination information 1211 and the "Confirm" key 1212. In contrast, an MFP 103 according to the third exemplary embodiment is configured to display a confirmation screen 1410 including a destination entry field 1411 and a "Complete" key 1412. In the following description of the third exemplary embodiment, only the parts different from those in the second exemplary embodiment will be described.

Figure 13:
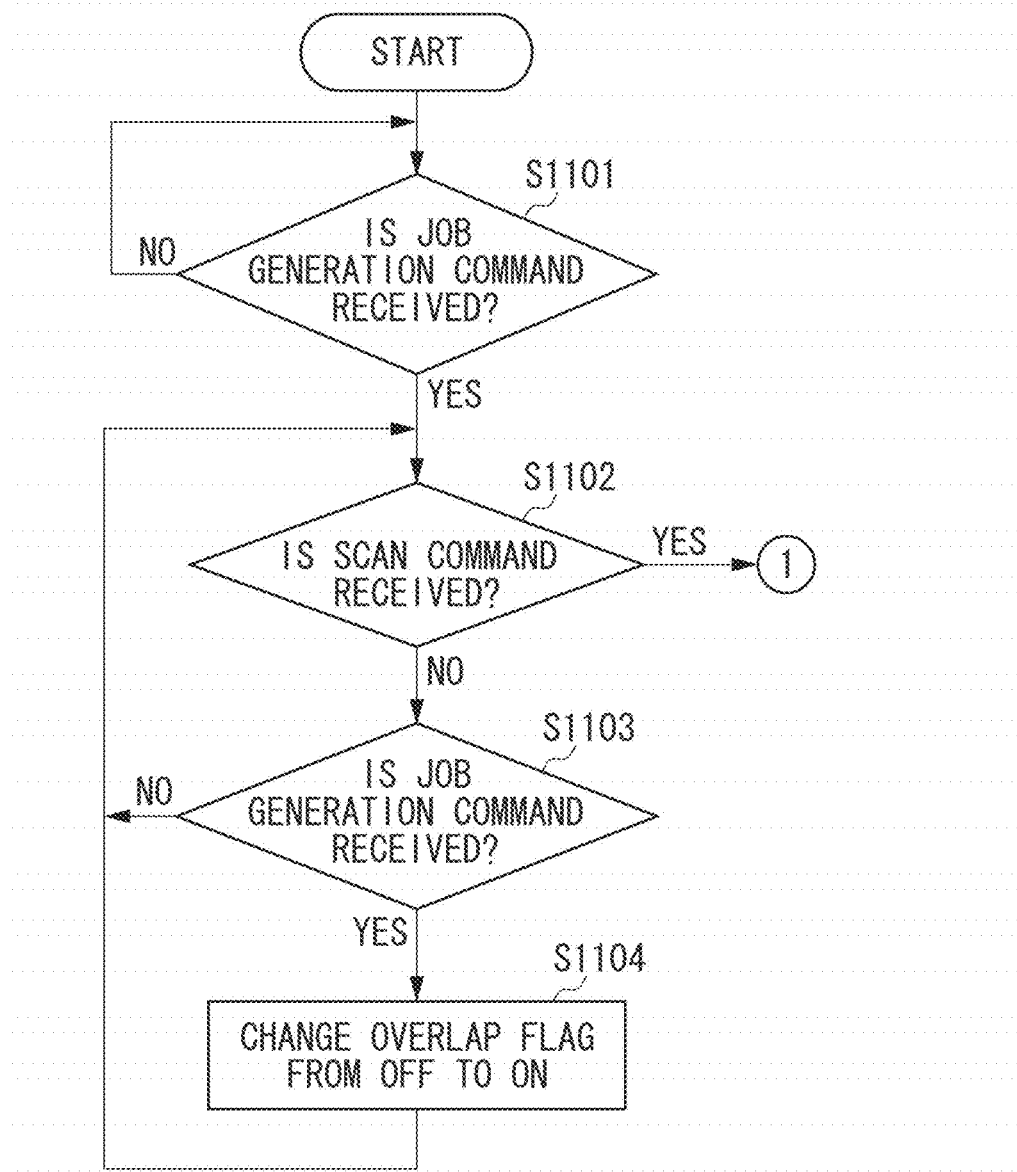
FIG. 13, which is composed of FIGS. 13A and 13B, is a flowchart illustrating an operation of an MFP 103 according to a third exemplary embodiment.
Figure 13B:
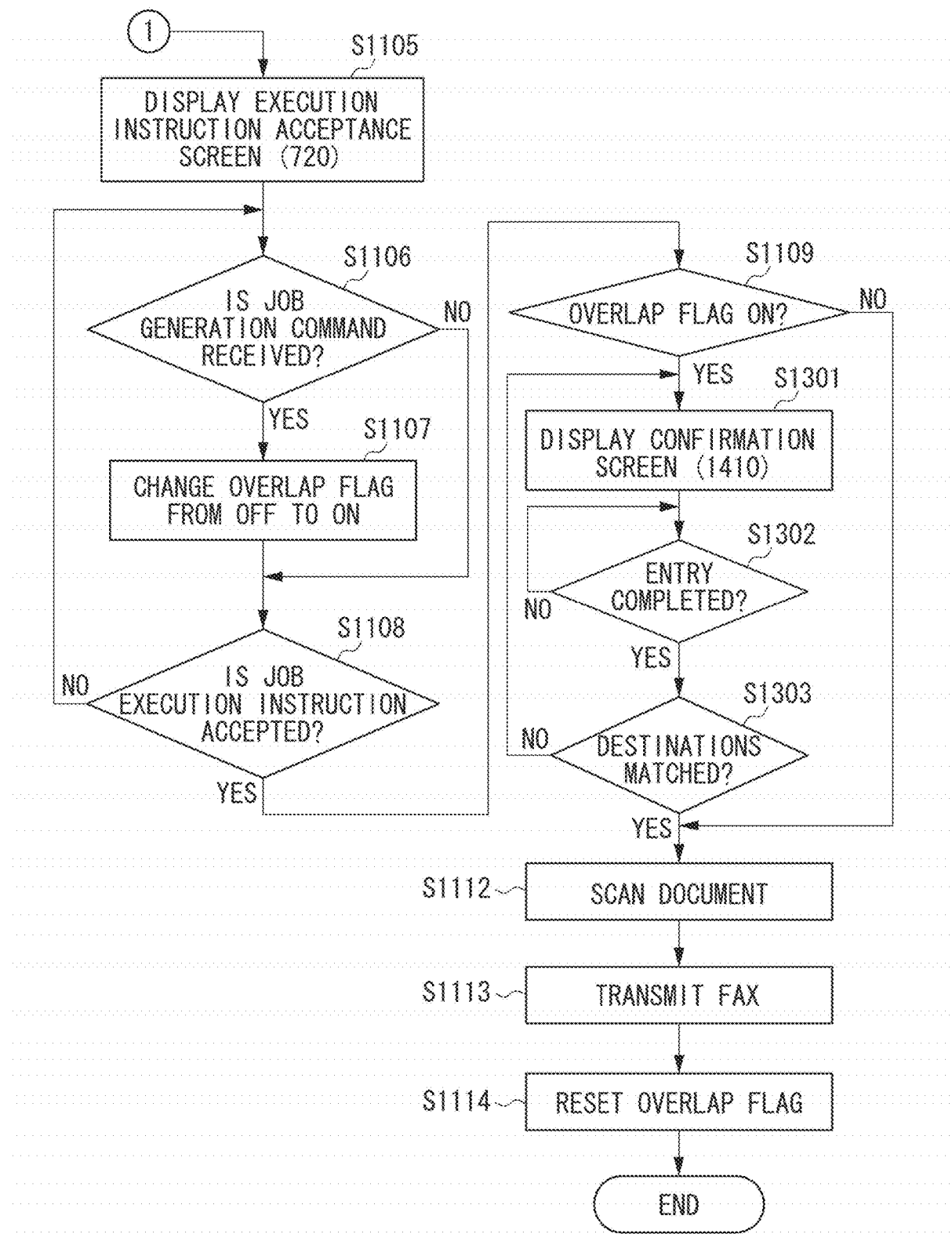

FIG. 13 is a flowchart illustrating an operation of the MFP 103. The processing in this flowchart is performed as an alternative to that in the flowchart in FIG. 11. The CPU 211 of the control unit 210 realizes each operation (step) in the flowchart illustrated in FIG. 13 by executing a control program stored in the ROM 212. In the flowchart in FIG. 13, steps S1301 to S1303 are added in place of steps S1110 and S1111 in FIG. 11. Since the processes in the other steps (steps S1101 to S1109 and steps S1112 to S1114) are similar to those in FIG. 11, redundant description thereof will be avoided.

Figure 14:
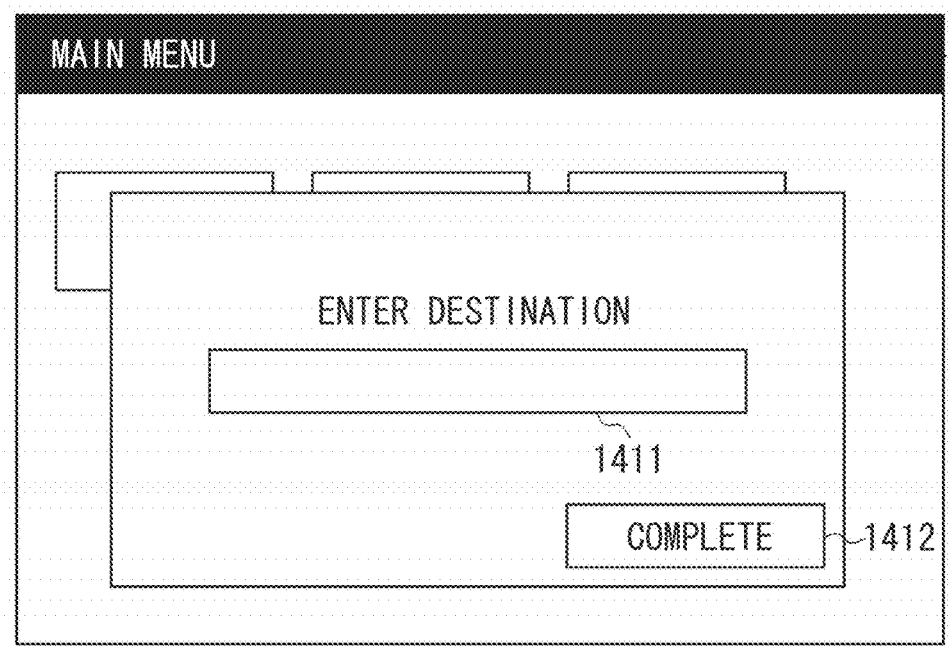
FIG. 14 illustrates an operation screen of the MFP 103 according to the third exemplary embodiment.

In step S1301, the CPU 211 displays the confirmation screen 1410 illustrated in FIG. 14. The confirmation screen 1410 includes the entry field 1411 for entering fax transmission destination information and the "Complete" key 1412. If the confirmation screen 1410 is displayed, unless the user enters destination information which matches the telephone number set in the setting field 502, the job is not performed. In step S1302, the CPU 211 determines whether the entry has been completed (whether the "Complete" key 1412 has been pressed). If the CPU 211 determines that the entry has been completed (YES in step S1302), the processing proceeds to step S1303. If, on the other hand, the CPU 211 determines that the entry has not been completed (NO in step S1302), the MFP 103 waits until the entry is completed. The confirmation screen 1410 may include an operation key for cancelling the execution of a job and an operation key for postponing the execution of a job.

In step S1303, the CPU 211 compares the destination information entered in the entry field 1411 with the telephone number set in the setting field 502 and determines whether the entered destination information matches the set telephone number. If the CPU 211 determines that the entered destination information matches the set telephone number (YES in step S1303), the processing proceeds to step S1112. If, on the other hand, the CPU 211 determines that the entered destination information does not match the set telephone number (NO in step S1303), the processing returns to step S1301.

As described above, according to the present exemplary embodiment, if a job request overlaps another job request, the user is requested to enter the destination information. Since the job is performed on condition that the entered destination information matches the content set on the tablet terminal side, erroneous transmission can be prevented without fail. In contrast, if a job request does not overlap another job request, fewer user operations are required, so that the usability can be improved.

As described above, according to the first to third exemplary embodiments, the MFP 103 receives a request relating to a job (a job generation command), and performs a job in response to accepting a job execution instruction from a user. If the MFP 103 receives a plurality of job requests, the MFP 103 provides the user with information for confirmation of the job. If the MFP 103 receives only one request, the MFP 103 does not provide the user with the information. Alternatively, if the MFP 103 receives a plurality of job requests, the MFP 103 displays a screen for confirming the job. If the MFP 103 receives only one request, the MFP 103 does not display the screen. These configurations can prevent erroneous job execution without significantly decreasing the usability.

In addition, the MFP 103 may use transmission methods other than fax. For example, the MFP 103 may use electronic mail (e-mail), server message block (SMB), or the file transfer protocol (FTP). If e-mail is used, the user sets an e-mail address as the destination. If SMB or FTP are used, the user sets a host name or a folder path of a destination server as the destination.

In addition, in the above description, an MFP including the printer 221 is used as an example of an image processing system. However, an arbitrary apparatus without a printer function may be applicable, as long as the apparatus includes a scanner function.

In addition, in the above description, tablet terminals having a wireless communication function are used as an example of an information processing apparatus. However, other types of apparatuses may be applicable as an information processing apparatus, as long as the apparatuses have a user interface and can communicate with external apparatuses. For example, personal computers (PCs), smartphones, or digital cameras may be used as an information processing apparatus.

In addition, in the above description, the operation of each step in FIGS. 9, 11, and 13 is assumed to be a software process that is realized by using a processor and a memory. However, a part of the steps may be changed to a hardware process. Alternatively, a software process and a hardware process may be combined and performed as a single step.

According to an exemplary embodiment of the present invention, erroneous job execution can be prevented without significantly decreasing the usability.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-245200 filed Nov. 27, 2013, which is hereby incorporated by reference herein in its entirety.

What is claimed is:

1. An image processing apparatus comprising a network interface, a scanner, a display, a processor and a memory containing instructions that when executed by the processor, cause the processor to perform operations, comprising:

receiving, via the network interface from an external apparatus, a transmission request for transmitting data based on an image obtained by reading a document using the scanner to a destination designated by a user operation via the external apparatus;

displaying a confirmation screen for confirming the destination to be transmitted based on the received transmission request before executing reading a document using the scanner on the display, after to receiving the transmission request from the external apparatus;

notifying, in a case where a further transmission request for transmitting data based on an image obtained by reading a document using the scanner to a destination designated by a user operation via another external apparatus is received from said another external apparatus while a screen related to the received transmission request is being displayed, said another external apparatus that has transmitted the further transmission request of signal indicating that the further transmission request can not be executed; and controlling to transmit the data based on the image obtained by reading the document using the scanner to the destination set for the transmission request based on a user instruction.

2. The image processing apparatus according to claim 1, wherein the user instruction is a transmission execution instruction accepted via the confirmation screen on the display.

3. The image processing apparatus according to claim 1, wherein the external apparatus is a mobile terminal.

4. The image processing apparatus according to claim 3, wherein the receiving receives, via a wireless network from the mobile terminal, the request.

5. The image processing apparatus according to claim 1, wherein the specified destination is a facsimile number.

6. The image processing apparatus according to claim 1, further comprising displaying an execution screen including display items for executing transmission based on the transmission request and not including information indicating the destination in response to receiving the transmission request from the external apparatus, wherein the screen displayed on the display is changed to the confirmation screen in response to receipt of the further transmission request in a state in which the execution screen is displayed.

7. The image processing apparatus according to claim 6, wherein the screen related to the received transmission request includes at least the execution screen and the confirmation screen.

8. A control method for controlling an image processing apparatus comprising a reading unit configured to read a document and generate image data, comprising:

receiving, via a network from an external apparatus, a transmission request for transmitting data based on an image obtained by reading a document using the scanner to a destination designated by a user operation via the external apparatus;

displaying, on a display unit, a confirmation screen for confirming the destination to be transmitted based on the received transmission request before executing reading a document using the scanner, after receiving the transmission request from the external apparatus;

notifying, in a case where a further transmission request for transmitting data based on an image obtained by reading a document using the scanner to a destination designated by a user operation via another external apparatus is received from said another external apparatus while a screen related to the received transmission request is being displayed, said another external apparatus that has transmitted the further transmission request signal indicating that the further transmission request can not be executed; and controlling to transmit the data based on the image obtained by reading the document using the scanner to the specified destination set for the transmission request based on a user instruction.

9. The control method according to claim 8, wherein the user instruction is a transmission execution instruction accepted via the confirmation screen on the display.

10. The control method according to claim 8, wherein the external apparatus is a mobile terminal.

11. A non-transitory computer-readable storage medium storing computer executable instructions that cause a control method for controlling an image processing apparatus to be executed, the image processing apparatus comprising a reading unit configured to read a document and generate image data, the control method comprising:

receiving, via a network from an external apparatus, a transmission request for transmitting data based on an image obtained by reading a document using the scanner to a destination designated by a user operation via the external apparatus;

displaying, on a display unit, a confirmation screen for confirming the destination to be transmitted based on the received transmission request before executing reading a document using the scanner, after receiving the transmission request from the external apparatus;

notifying, in a case where a further transmission request for transmitting data based on an image obtained by reading a document using the scanner to a destination designated by a user operation via another external apparatus is received from said another external apparatus while a screen related to the received transmission request is being displayed, the external apparatus that has transmitted the further transmission request of signal indicating that the further transmission request can not be executed; and controlling to transmit the data based on the image obtained by reading the document using the scanner to the specified destination set for the transmission request based on a user instruction.

12. The non-transitory computer-readable storage medium according to claim 11, wherein the user instruction is a transmission execution instruction accepted via the confirmation screen on the display.

13. The non-transitory computer-readable storage medium according to claim 11, wherein the external apparatus is a mobile terminal.

* * * * *